INVENTOR.
BURNIE M. CRAIG

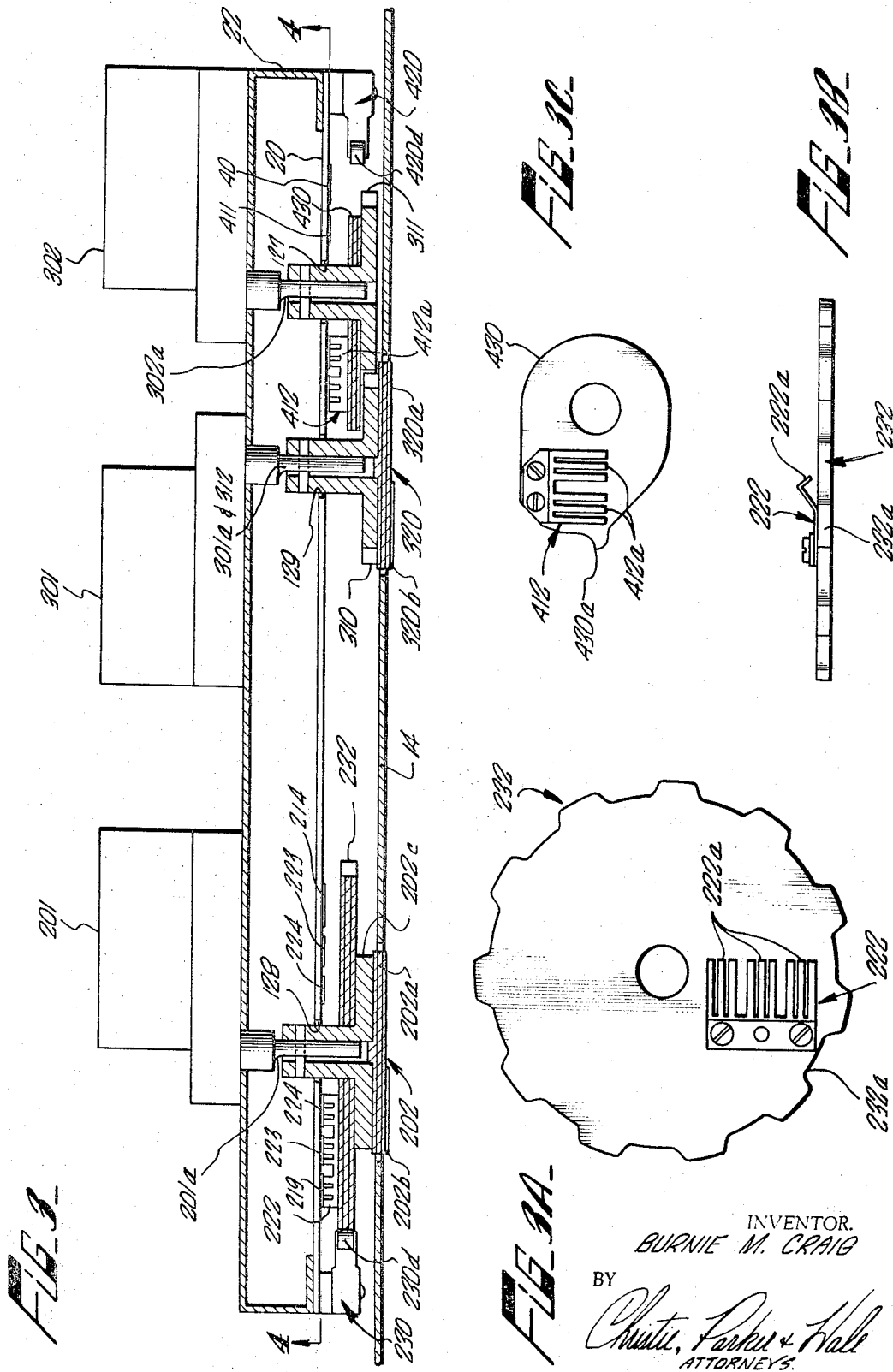

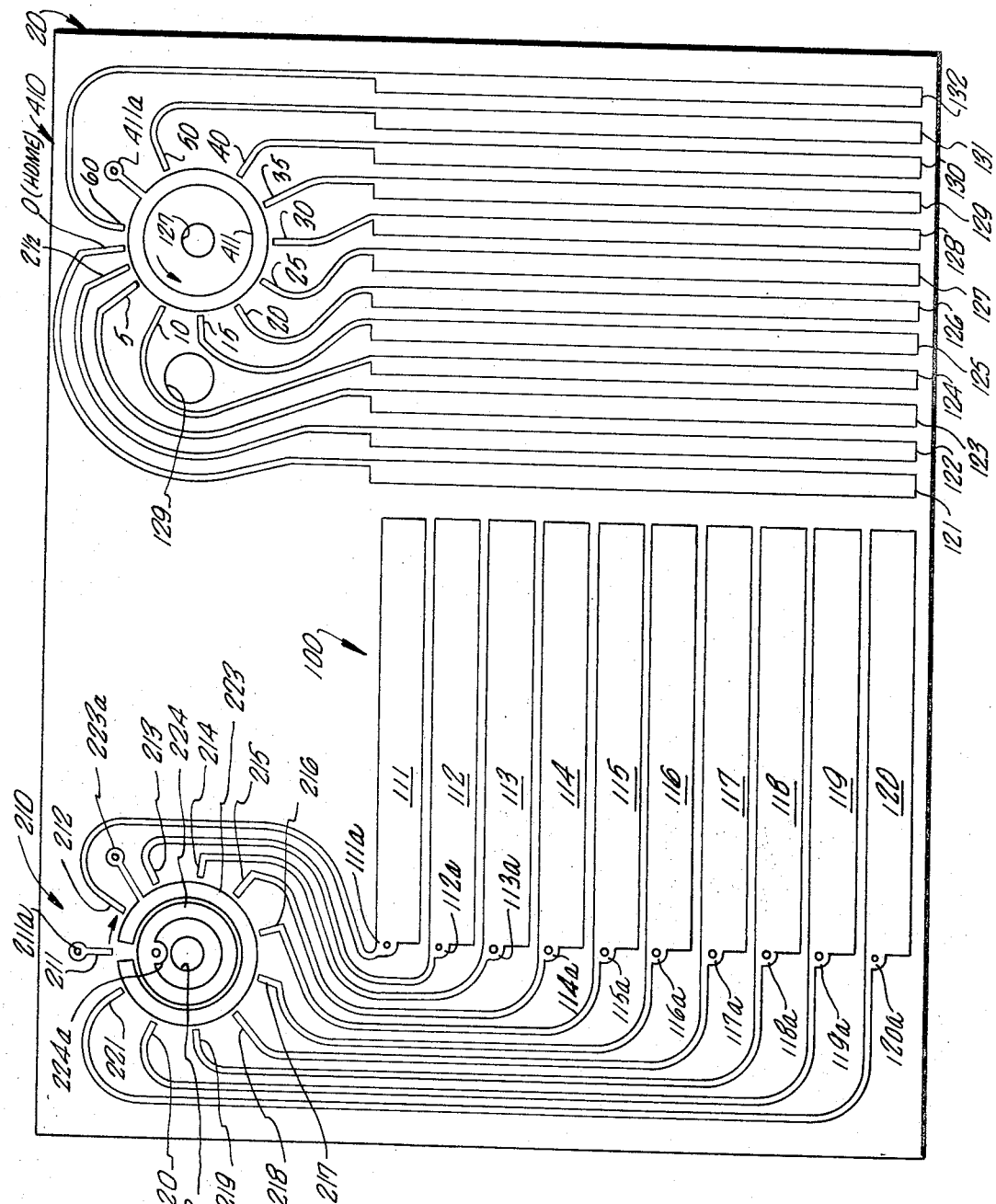

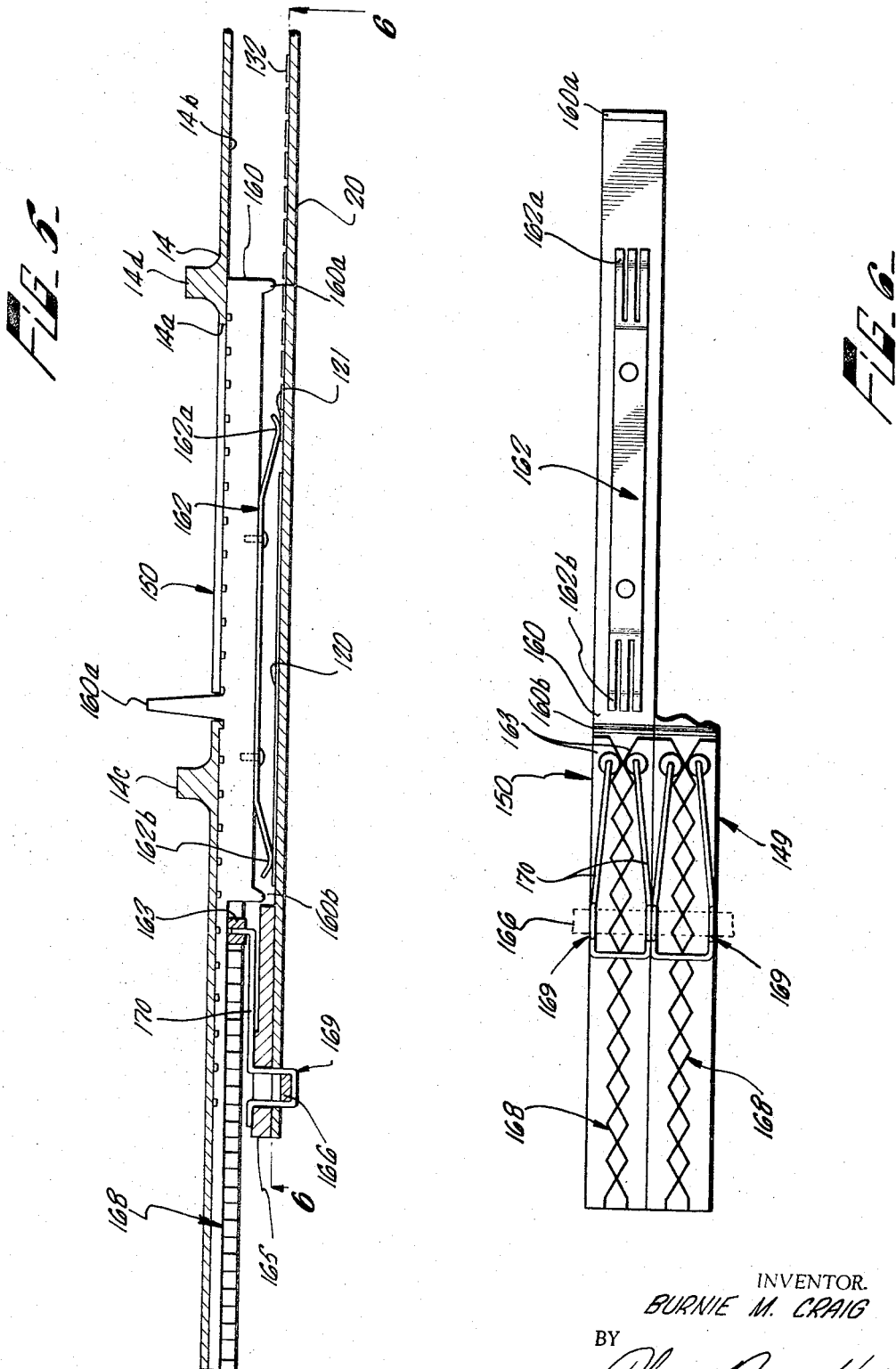

United States Patent Office 3,335,298
Patented Aug. 8, 1967

3,335,298
SWITCHING APPARATUS
Burnie M. Craig, Pasadena, Calif., assignor, by mesne assignments, to Thompson Manufacturing Company, a corporation of California
Filed June 15, 1964, Ser. No. 375,118
11 Claims. (Cl. 307—141)

This invention relates to switching circuits and, more particularly, to a linear-operated switching matrix for use in a controller for automatic lawn sprinkling systems.

Automatic lawn sprinkling systems are generally known and have a controller for applying electrical signals to solenoid operated control valves. The controllers are arranged for applying the electrical signals to the solenoid valves sequentially, one by one, causing the valves to turn on the flow of water for the length of time the electrical signal is applied to the solenoid. A program device is provided in the controllers for determining the length of time an electrical signal is applied to the solenoid.

One type of prior art controller has a motor driven timer with a solenoid for returning the timer to an initial condition. This prior art controller suffers from the serious disadvantage that it is composed of specially manufactured and expensive components.

Electromechanical controllers are known. For example, one electromechanical controller has cams and mechanical linkage mechanisms for effecting control. The cams and mechanical linkage mechanisms are specially manufactured parts which are very expensive to manufacture and quite complicated. Another electromechanical controller contains a number of programming drums. The programming drum type controller is undesirable because it is extremely difficult to adjust. The drum type controller is also very complex and costly.

The aforementioned disadvantages of the prior art are overcome in a system which embodies the present invention. The embodiment of the invention is characterized by its extreme simplicity and low cost of manufacture. For example, a unique programmer is used which is composed of linear-operated switches. The linear switching arrangement in the programmer reduces the manufacturing cost of a controller embodying the present invention by a factor of one-half.

Additionally, the controller embodying the present invention lends itself for printed circuit construction, which provides a marked reduction in cost of manufacture. The printed circuit board construction of the controller is quite important in simplifying the wiring required and allows a compact, easily operated programming unit to be made. Additionally, the switching arrangement of the present invention allows a single line of an alternating current control system to be switched during control operations, thereby simplifying the switching circuitry.

The market for controllers for automatic lawn sprinkling systems is very competitive. A substantial reduction in cost of a controller, such as that afforded by the present invention, is of considerable importance, particularly where large quantities of controllers are to be manufactured.

This invention is directed to a novel electrical circuit including switches comprising a printed circuit board having electrical conductive segments. A co-pending application entitled Control Apparatus, filed in the names of Craig and Shaffer on June 15, 1964, and bearing the Ser. No. 375,026 discloses some of the same subject matter as this application but is directed to other features not claimed in this patent application.

Briefly, a control apparatus embodying the present invention comprises: a printed circuit board having a plurality of conductive segments thereon. A programming means is provided comprising first and second groups of said conductive segments positioned parallel with respect to the segments in the same group, the second conductive segments being positioned substantially perpendicular to, and adjacent the first segments. Switching means is provided for each of the first segments, the switching means comprising a mounting member and first and second electrical brushes extending outwardly from the mounting member and electrically connected together and positioned with respect to each other so that one brush provides a continuous electrical contact with the corresponding first conductive segment, and the other brush provides electrical contact with one of the second segments, depending upon the position of the mounting member. Each of the slideable switch means is slideably mounted for movement parallel with the first segments. Rotary switch means is provided comprising a third group of the conductive segments which are positioned in a circular pattern. Rotatably mounted brush means is provided for making electrical contact, individually, with the third conductive segments, and motor means is mechanically and rotatably coupled to the brush means for causing electrical contact to be made, sequentially, betweeen the brush means and the third conductive segments. A fourth group of the conductive segments electrically connect the segments in the programming means to the segments in the rotary switch means.

Briefly, a subcombination of the present invention is directed to a switching matrix, comprising: a printed circuit board having a plurality of conductive segments thereon. The conductive segments comprise first and second groups of the conductive segments, which are elongated and positioned parallel with respect to each other in the same group. The second segments are positioned adjacent to, and perpendicular to, the first segments. Switch means is provided for each of the first segments. The switch means comprises first and second slideable brush means electrically connected together and spaced apart for providing an electrical connection between the corresponding first conductive segment and only one of the second segments. Each of the slideable switch means is slideably mounted for movement parallel with the first segments, with one of the brushes in continuous electrical contact therewith.

These and other aspects of the present invention may be more fully understood with reference to the following description of the drawings of which:

FIG. 3 is a section view of the controller shown in FIG. 1 taken along the lines 3—3;

FIG. 3A is a plan view of the selection means cam, and brush means shown in FIG. 3;

FIG. 3B is a side elevation view of the cam and brush means shown in FIG. 3A;

FIG. 3C is a plan view of the cam and brush means for the compare means shown in FIG. 3;

FIG. 4 is a plan view of the printed circuit board shown in FIG. 2 and is shown on a reduced scale;

FIG. 5 is an enlarged section view of the controller shown in FIG. 1 and shows the switching means and printed circuit board and is taken along the lines 5—5; and FIG. 6 is a section view of a part of the switching means shown in FIG. 5 taken along the lines 6—6 of FIG. 5 with a portion of one of the switches broken away and the mounting member removed.

Figure 1:
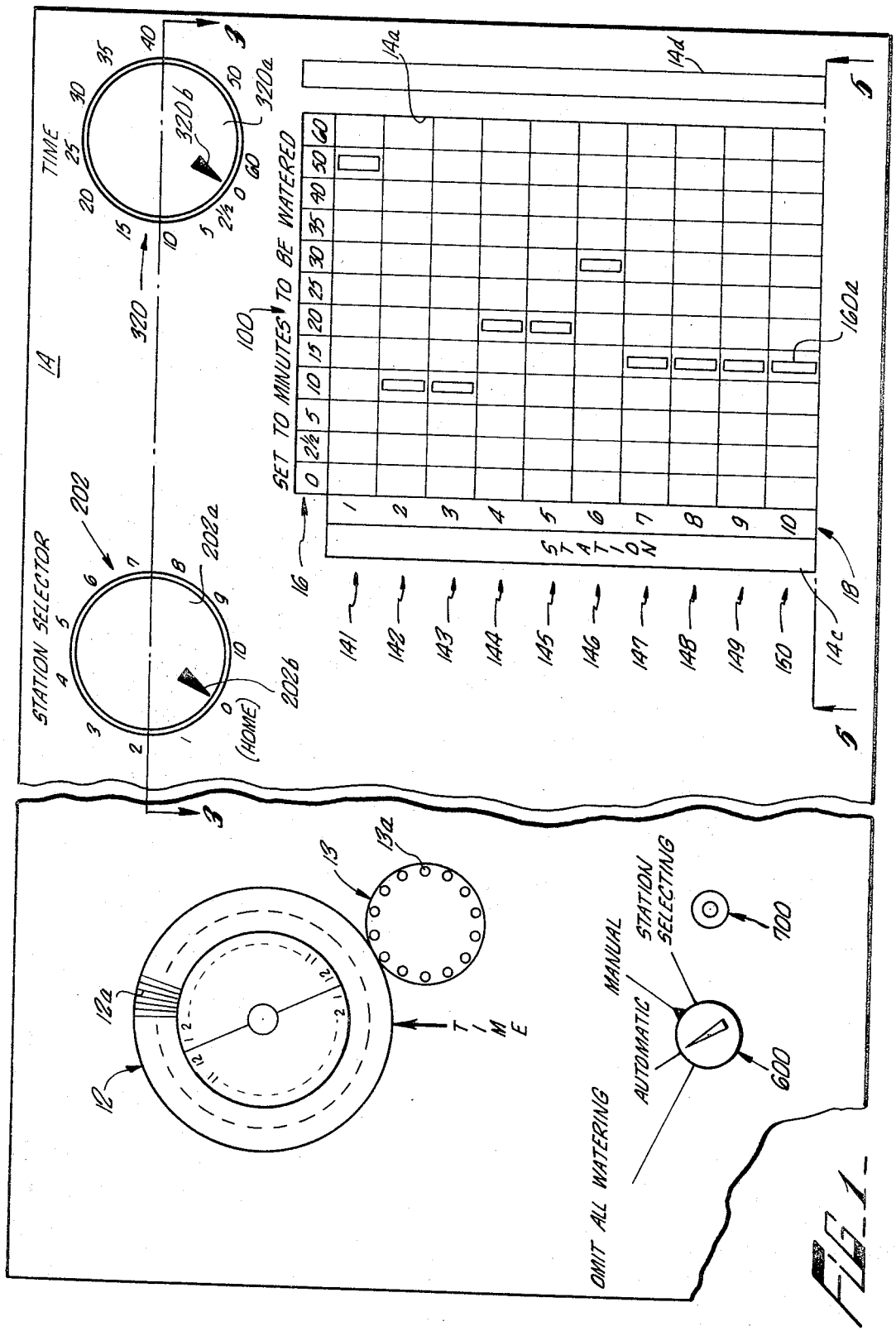
FIG. 1 is a front elevation view showing the control panel of a control apparatus and embodying the present invention.

Refer now to the front elevation view of the panel 14 of the control apparatus shown in FIG. 1. In a preferred embodiment of the present invention, the controller is used for sequentially operating a number of different valves in a lawn sprinkling system. The valves are solenoid-operated valves. The coils of the solenoids are illustrated at 500 in FIG. 2. The connections to the solenoid valves are not shown in FIG. 1, as the connections are made from the rear of the control panel.

A programmer 12 is mounted on the control panel 14. The programmer 12 is provided for starting each watering cycle. The programmer 12 is a conventional programmer or selector which allows the user to initiate a watering cycle one or more times during a day as desired. The programmer 12 has a plurality of movable control members 12a which may be actuated to select the time that each watering cycle is to be started. The programmer 12 is preferably of the type manufactured by the Torque Time Controls, Inc., located in Mount Vernon, N.Y., and identified as the 8000 Series Program Selector.

Additionally, an omit controller 13 is provided in conjunction with the programmer 12, which allows the programmer to specify the day or days he wishes watering to be omitted. The days upon which watering is to be omitted are selected by actuating control members 13a. The use of the omit controller 13 is not material to the present invention, and the details thereof are not disclosed herein.

A conrol switch 600 is provided for selecting the mode of operation desired by the controller. There are four modes of operation of the controller. For example, in one mode all watering can be omitted; in another mode, the controller works automatically; in another mode, the controller can be operated manually; and in another mode, the station it is desired to water can be selected by appropriately positioning the switch 600. Although the various modes of operation, which may be selected by the switch 600, are indicated in the figure of FIG. 1, the automatic mode of operation is the one which is of interest in this application and only the details thereof are described in detail.

Also located on the control panel 14 is a start switch 700. As will be explained in detail, the operation of the controller may be started by either the programmer 12 or by actuating the start switch 700.

Figure 2:
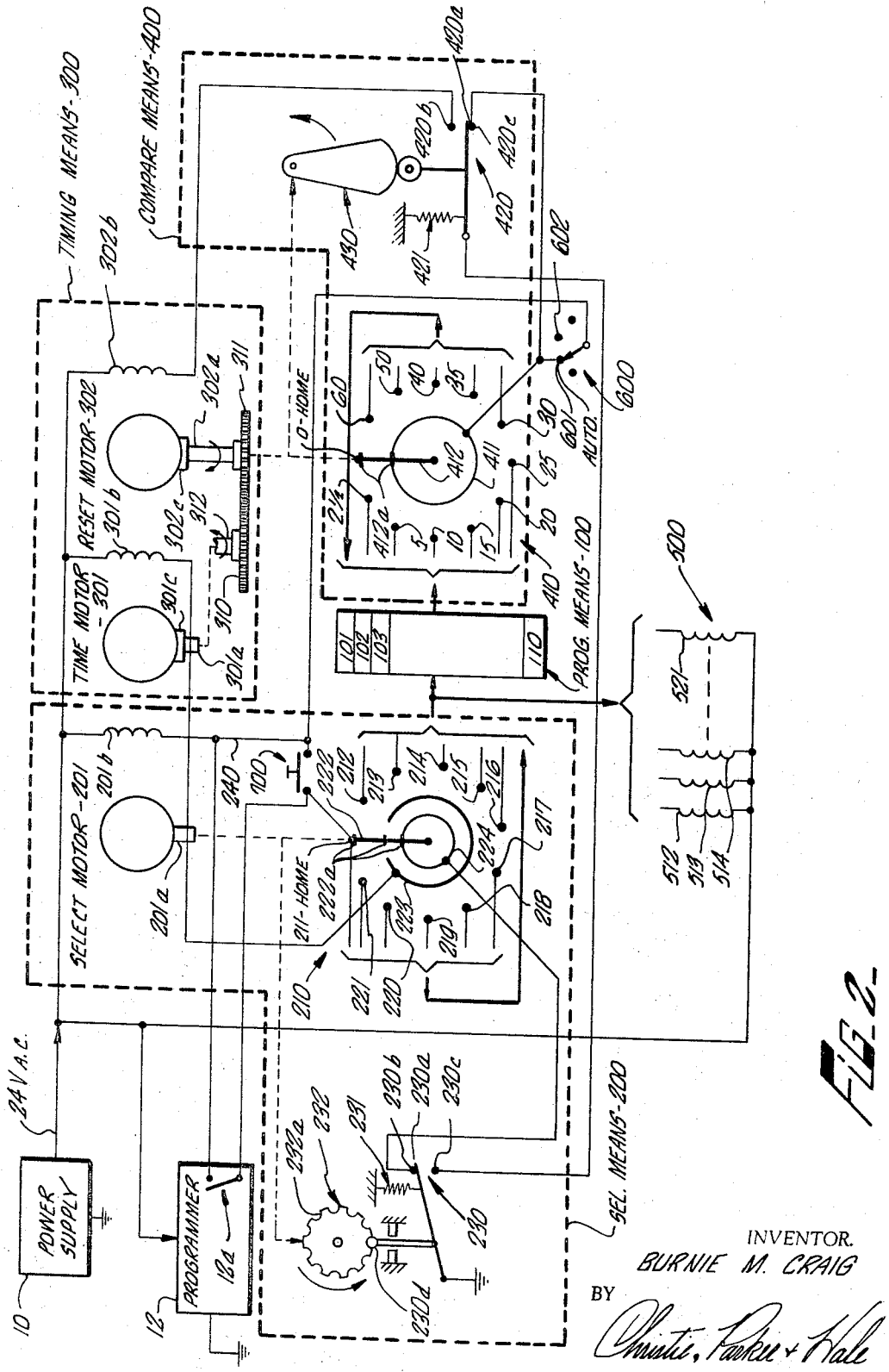
FIG. 2 is a schematic diagram which illustrates the control apparatus shown in FIG. 1 and embodies the present invention.

The controller is capable of watering one of ten different stations under control of the solenoid valves 500 (see FIG. 2). A station selector indicator 202 is provided on the front of the panel for providing an indication of the particular station which is being watered. The indicator has a rotatable dial 202a, a pointer 202b affixed to the dial 202a and numerals affixed around the periphery of the dial 202a on the panel 14. The numerals include 1 through 10 corresponding to the ten stations. A 0 or home position is provided, and the pointer 202b points to the home position when none of the stations are being watered.

The controller is operative for watering each one of the ten stations for a preselected length of time. A programmer 100 is provided for specifying the time each one of the stations is to be watered. The programmer includes ten linear switches 141 through 150 for selecting the time each one of the ten stations is to be watered. The switches 141 through 150 correspond to stations 1 through 10. A station indicator 18 bearing the numerals 1 through 10 is shown vertically on the panel 14 opposite the corresponding switches. Each of the switches 141 through 150 may be positioned to one of twelve different positions corresponding to twelve different selectable times the corresponding station is to be watered. The control panel includes an indicator 16 having twelve numerals corresponding to the twelve different time intervals the stations may be watered. As indicated in FIG. 1, at 16, each of the stations may be watered for any of the following minute intervals: 0, 2½, 5, 10, 15, 20, 25, 30, 35, 40, 50, and 60.

A time indicator 320 is provided on the control panel for providing an indication of the time a station has been watered. The indicator 320 has a circular dial 320a on which is affixed a pointer 320b. Numerals are affixed around the outside of the dial 320a. The pointer 320b indicates the amount of time the station indicated by 202 has been watered by pointing to the appropriate numeral. Other details of the station selection indicator 202, the time indicator 320, and the programmer 100 will be described hereinbelow.

Refer now to the schematic diagram of FIG. 2. The controller includes a selection means 200, the programming means 100, a timing means 300, and a compare means 400, along with a power supply 10 and the programmer 12.

Refer now in particular to the selection means 200. The selection means 200 applies the control signals to the solenoid coils 500, one by one. The selection means 200 has a separate output circuit for each of the ten solenoid coils 500. For purposes of illustration, the output circuits of the selection means 200 are shown taken at the contacts 212 through 221 of a commutator 210. Actually, as will be described in detail in connection with FIG. 4, the output circuits are taken at the programming means. The commutator 210 actually has eleven contacts 211 through 221. The contact 211 is a home position for the commutator, the purpose of which is explained hereinbelow. The contacts 212 through 221 are connected to one end of the solenoid coils 512 through 521, respectively. The opposite ends of the coils from the commutator 210 are connected in common to the output circuit of a power supply 10. The power supply 10 applies a 24 volt alternating current signal to the solenoid coils 500. Whenever one of the solenoid coils 500 is to be energized and cause water to flow through the corresponding solenoid valve to the water sprinkling system, the selection means 200 couples the particular solenoid coil to ground, causing current to flow from the power supply 10 through the solenoid coil.

The commutator 210 is a switching device and has a rotatably mounted brush assembly 222 having three electrical brushes 222a. The contacts 211 through 221 are positioned in a circular pattern so that one of the brushes 222a makes electrical contact with each of the contacts as it sweeps around in a circular path. The commutator 210 has two circular electrical conductors 223 and 224. The circular conductors 223 and 224 form a continuous electrical path in such a position that the other two brushes 222a of the brush assembly 222 make electrical contact therewith as the assembly 222 sweeps about in a circular path making contact with the contacts 211 through 221. The brushes 222a are electrically connected together in the assembly 222, thereby causing the contacts and rings 223 and 224 to be shorted together. The circular contact 223 has a segment removed therefrom so that the brush assembly 222 arrives at a position halfway between the contacts 211 and 212 before electrical contact is made between the conductor 223 and the corresponding brush 222a.

The commutator 210, the programming means 100, and compare means 400 comprise a special integrated printed circuit board assembly described hereinbelow with reference to FIGS. 3 through 6.

The selection means 200 includes a selection motor 201. The selection motor 201 has an output shaft 201a which is mechanically coupled to the brush assembly 222. The mechanical interconnection is illustrated by dashed lines in FIG. 1. The selection motor 201 is a conventional timing motor which rotates its output shaft 201a at the rate of two revolutions per minute. In a preferred embodiment of the present invention, the selection motor 201 is of the type manufactured by the Hansen Manufacturing Company, Inc. located in Princeton, Ind., and identified as a Synchron timing motor.

The armature winding of the selection motor 201 is illustrated at 201b, and is connected between a conductor 240 and the output circuit of the power supply 10.

The selection means 200 also has a cam actuated switching mechanism operated from the shaft 201a. The cam actuated switch mechanism includes a cam actuated switch 230 having a pole 230a and contacts 230b and 230c. The pole 230a of the switch 230 is mechanically and rotatably coupled to a cam 232. The cam 232 is rotatably mounted and has eleven indentations 232a. The indentations 232a of the cam allow the pole 230a to be biased, by means of a spring bias mechanism 231 into electrical contact with the contact 230b, whereas the raised portions of the cam in between the indentations 232a cause the pole 230a to be forced into electrical contact with the contact 230c. The pole 230a is connected to ground (0 volts potential). The cam 232 is mechanically positioned with respect to the brush assembly 222 so that the indentations 232a allow the pole 230a to be spring biased into electrical contact with 230b whenever the brush assembly 222 is in contact with one of the electrical contacts 211 through 221. However, the cam 232 is arranged so that the pole 230a is forced into electrical contact with 230c whenever the brush assembly 222 is out of contact in between two of the contacts 211 through 221. It should also be noted that the electrical connection between the contact 230b and the pole 230a is broken before the connection is made between circular conductor 223 and the brush assembly 222. The mechanical connection between the shaft 201a and the cam 232 is illustrated by a dashed line in FIG. 2.

Refer now to the timing means 300. The timing means 300 is the primary timing mechanism for the controller shown in FIG. 2. The timing means 300 includes a timing motor 301 and a reset motor 302. The timing motor 301 is a .96 revolutions per hour timing motor of the type manufactured by the above noted Hansen Manufacturing Company, Inc. and identified as a Synchron timing motor with a one way clutch. The one way clutch is illustrated in FIG. 2 at 301c and is positioned in between the motor and the output shaft 301a. The one way clutch 301c permits the shaft 301a to be driven or rotated at a higher speed than the rotor of the motor. The output shaft 301a of the timing motor 301 is shown connected to an output shaft 312 of the timing means 300. The connection between 301a and 312 is illustrated by dashed lines in FIG. 2. Actually the shafts 301a and 312 are the same shaft as described with reference to FIG. 3. The shaft 312 is rotatably coupled to a brush assembly 412 of a commutator 410 in the compare means 400. Coupled to the output shaft 312 is a gear 310 having teeth which engage the teeth of another gear 311. The gears 311 and 310 have a 1 to 1 gear ratio.

The reset motor 302 is of the type manufactured by the above noted Hansen Manufacturing Company, Inc. and referred to as a Synchron timing motor with a one way clutch. The reset motor 302 is quite similar to the timing motor 301 except that it rotates its output shaft at a much higher speed of five revolutions per minute rather than .96 revolution per hour. The one way clutch is illustrated at 302c in FIG. 2. The output shaft 302a of the reset motor is mechanically and rotatably connected to the gear 311.

The armature windings of the timing motors 301 and 302 are illustrated at 301b and 302b, respectively. The armature windings 301b and 302B have one end thereof connected in common to the power supply 10 whereas the opposite ends of the windings 301b and 302b are connected to the conductor 223 of the commutator 210 and a contact 420b in the compare means 400, respectively.

When the armature winding 301b of the timing motor is energized, it causes the timing motor 301 to drive its output shaft 301a causing the output shaft 312 to be rotated in synchronism therewith and provide an indication of elapsed time. The elapsed time indication is provided due to the change in angular position of the shaft 312. While the shaft 312 rotates the gear 310 is rotated causing the gear 311 to rotate. However, due to the one way clutch 302c, the shaft 301a is free to rotate without rotating the rotor of the reset motor 302.

The armature winding 302b of the reset motor is energized when the armature winding 301b of the timing motor is de-energized When the armature winding 302b is energized it causes the output shaft 301a to rotate in the direction indicated in FIG. 2 rotating the gear 311 and 310 causing the output shaft 312 to be rotated at a much higher speed than is caused by the timing motor 301. The one way clutch 301c allows the gear 310 and the shaft 302a to rotate freely without rotating the rotor of the timing motor 301.

Refer now to the compare means 400. The compare means 400 has a commutator 410 which is constructed quite similar to the commutator 210 as will be described in more detail hereinafter. The commutator 410 has twelve electrical contacts which are referenced by symbols 0, 2½, 5, 10, 15, 20, 25, 30, 35, 40, 50 and 60 which correspond to minutes of elapsed time. A brush assembly 412 is provided and has two electrical brushes 412a, one of which makes electrical contact with the contacts of the commutator 410 as the brush assembly 412 is rotated. The commutator 410 includes a circular conductor 411 which is positioned so that one of the other brushes 412a makes continuous electrical contact therewith. The brush assembly 412 provides a direct electrical connection between the brushes 412a and the conductor 411. The contacts of the commutator 410 are spaced apart so that the brush 412a breaks contact with one electrical contact before contact is made with the adjacent electrical contact.

A cam actuated switch 420 is provided. The cam actuated switch 420 is a conventional cam actuated switch which is well known in the switching art and has two electrical contacts 420b and 420c and an electrical pole 420a for making electrical contact with the contacts. A spring bias system 421 is provided for normally biasing the pole 420a into electrical contact with the contact 420b.

A cam 430 is rotatably coupled to the output shaft 312 (as indicated by dashed lines in FIG. 2) of the timing means 300. The cam 430 is formed and positioned relative to the brush assembly 412 so that whenever the brush 412 is in electrical contact with the 0 minute contact, a home position, the cam 430 causes the cam actuated switch 420 to be actuated with the pole 420a in electrical contact with 420c. Whenever the shaft 312 is rotated so that the brush assembly 412 is not in a home position, the cam 430 is rotated such that the pole 420a allows the spring bias mechanism 421 to bias the pole 420a into electrical contact with 420b. The contact 420c is connected to the circular conductor 411 of the commutator 410. The pole 420a is electrically connected to the contact 230c in the selection means 200.

Refer now in particular to the programming means 100. The programming means 100 is provided for storing an indication of the length of time a control signal is to be applied at each of the contacts 212 through 221 of the selection means 200. The programming means 100 comprises a switching matrix with ten different sections 101 through 110 corresponding to the contacts or output circuits of the selection means 200. The section 101 may be connected between the contact 212 of the commutator 210 and any one of the contacts of the commutator 410. The section 101 includes the switch 141 (see FIG. 1) which allows an operator to establish a connection between the contact 212 and one of the contacts of the commutator 410, according to the length of time the user wants the solenoid coil, connected to the contact 212, to receive a control signal. For example, if a control signal is to be applied at the contact 212 for 50 minutes, the switch 141 of the section 101 is set so that a connection is established between the contact 212 and the contact 50 of the commutator 410.

Each of the other switching circuits 102 through 110 of the programming means 100 are similar to the switching circuit 101 but in contrast to 101 are connected to the contacts 213 through 221. Similar to the switching circuit 101, the output circuits of the switching circuits 102 through 110 include twelve output circuits which are connected to the contacts 0 through 60 of the commutator 410. The switching circuits 102 through 110 include the switches 142 through 150 shown in FIG. 1. In this manner a separate program time can be established for the control signal at each of the contacts of the commutator 210.

The programming means 100 comprises a printed circuit board as described with reference to FIGS. 4 through 6 hereinbelow.

The selector switch 600 is shown in FIG. 2 for selecting the mode of operation of the controller. For example, when the selector switch 600 is in the position indicated in FIG. 2, an electrical connection is established between the conductor 240 and a contact 601 of the switch 600. The contact 601 is connected to the conductor 411 and the contact 420c. When the selection switch 600 is in the position indicated, the controller is in an automatic mode of operation the details of which will be explained hereinafter. The selection switch 600 also has other positions. For example, when the switch 600 is positioned in contact with 602 the controller will not go through its control cycle of operation allowing the user to control the watering system manually. The automatic operation of the controller is of concern herein and only the automatic operaiton is described in detail.

Consider now the operation of the controller. The operation of the controller can be initiated by either actuating a start switch 700 or by actuating the switch 12a (shown for purposes of illustration in FIG. 2) in the programmer 12 which in either case causes an electrical connection to be established between the conductor 240 and ground via the home contact 211, the brush assembly 222, the circular conductor 224, the contact 230b, and the pole 230a. After the operation of the controller has once been initiated, four basic timing cycles take place: First, the brush assembly 222 is moved into contact with one of the electrical contacts 212 through 221 of the commutator 210. Second, the timing motor 301 is energized causing the reference member or output shaft 312 to provide an indication of elapsed time corresponding to the time that a control signal is being applied at a contact of the commutator 210. Third, after the time specified by the setting of the programming means 100 has elapsed, the brush assembly 222 is moved off of the contact of the commutator 210 and is positioned in between that contact and the adjacent contact. Fourth, the reset motor 302 is energized causing the output shaft 312 and the brush assembly 412 to be rapidly reset to a home position.

Consider these operations in detail. Consider first of all the first timing cycle. Assume that a connection has been established between the conductor 240 and ground by either the switch 700 or the programmer 12. The connection is maintained long enough to allow the armature winding 201b to cause the motor 201 to move the brush assembly 222 to a position in between the contacts 211 and 212 and cause the cam 232 to actuate the switch 230 and cause the pole 230a to form an electrical contact with the contact 230c. This establishes a ground connection to the conductor 240 via the switch 600, the contact 420c, the pole 420a, the contact 230c and the pole 230a. Once this connection is established, the winding 201b is continuously energized until the brush assembly 222 has rotated into electrical contact with the contact 212. At this point the cam 232 allows the pole 230a to again be moved into electrical contact with 230b.

The second timing cycle is now initiated wherein the timing motor 301 is energized. The armature winding 301b of the timing motor 301 now has one end connected to ground via the circular conductor 223, the brush assembly 222, the circular conductor 224, the contact 230b and the pole 230a. This causes the timing motor 301 to be energized and commence rotating the output shaft 312 at the rate of .96 revolution per hour. The solenoid coil 512 is connected to ground potential via the contact 212, the brush assembly 222, the circular conductor 224, the contact 230b and the pole 230a causing the solenoid coil to be energized and the corresponding solenoid valve to be actuated allowing the flow of water therethrough.

Assume that the switching circuit 101 of the programming means 100 is set so that a control signal is to be applied to the contact 212 for 50 minutes. With ground potential connected to the contact 212, the switching circuit 101 connects the ground potential thereat to the contact 50 of the commutator 410. Returning again to the second cycle of operation, the timing motor 301 continues operation rotating the output shaft 312 and the brush assembly 412 until an electrical connection is established thereby with contact 50. At this point the armature winding 201b is connected to ground via the conductor 240, the switch 600, conductor 411, the brush assembly 412 and the contact 50 of the commutator 410, the switching circuit 101 of the programming means 100, the commutator 210 and the switch 230.

At this point the third cycle of operation is commenced wherein the brush assembly 222 is moved to a position intermediate two contacts. To this end, the energized armature winding 201b causes the select motor 201 to ratate the output shaft 201a and the brush assembly 222 until the cam 232 causes the pole 230a to be moved into electrical contact with 230c. At this point ground connection is broken to the winding 201b by the switch 230 and the brush 222 is out ot contact with any of the contacts of 210. However, during the second cycle when the timing motor 301 rotated the shaft 312, the cam 430 was also rotated allowing the pole 420a to be moved into electrical contact with 420b. With the pole 230a in electrical contact with 230c, an electrical connection is established to the armature winding 302b of the reset motor 302 via the switch 420 and the switch 230. This causes the reset motor 302 to be energized causing the output shaft 302a to be rotated at a fast reset speed of five revolutions per minute until the output shaft 312 is rotated back to its initial or home position with the brush assembly 412 in electrical contact with the 0 or home contact.

When the shaft 312 is positioned in a home position, the cam 430 is again positioned so that the pole 420a is forced into electrical contact with 420c. In this position, the armature winding 201b is again connected to ground via the conductor 240, the switch 600, the switch 420, and the switch 230. It will now be recognized that this is the first cycle of operation. Thus, the winding 201b of the select motor is energized again and causing the brush assembly 222 to be rotated into electrical contact with the contact 213. The operation described hereinabove is repeated for each contact of the commutator 210 until the brush assembly 222 is returned to its home position in electrical contact with the home contact 211.

Consider now the actual physical construction of the controller as shown in the section view of FIG. 3. The section view of FIG. 3 is taken along the lines 3—3 of FIG. 1. The slideable switches of the programmer 100 are removed for clarity in FIG. 3. The motors 201, 301, and 302 are mounted on a bridge or mounting member 22. The printed circuit board 20 is connected to the mounting member 22 by means of bolts which are not shown in FIG. 3.

Referring in particular to the station selector indicator 202, the circular dial 202a is attached to a flanged member 202c which is pinned to the shaft 201a of the select motor 201. In this manner, the dial 202a and the pointer 202b are rotated with the shaft of the select motor 201 and thereby provide an indication of the particular station which is being watered.

The cam 232 is shown press fitted on the flanged member 202c. The switch 230 is mounted with screws on the printed circuit board 20 adjacent to the cam so that a roller member 230d of the switch rides on the outer surface of the cam 232. The roller member 230d of the switch 230 is connected to the pole 230a (see FIG. 2) of the switch 230, causing the pole 230a to be actuated from one position to the other, depending on the position of the member 230d. FIG. 3A shows a top elevation view of the cam 232, showing the actual physical configuration of the indentations 232a.

Refer now in particular to the timing indicator 320. The circular dial 320a is attached to the gear 310 which has a flange pinned to the output shaft 301a of the motor 301. In this manner the dial 320 and the pointer 320b are rotated with the output shaft 301a of the motor 301, thereby providing an indication of the time water is being applied at the station indicated by the selection indicator 202. As indicated in FIG. 3, the output shaft 312 of the timing means 300 is actually the same member as the output shaft 301a.

The gear 311 has a flange pinned to the output shaft 302a of the reset motor 302. The cam 430 is securely press fitted on the flange of the gear 311. FIG. 3C shows a top elevation view of the cam 430. As indicated in FIG. 3C, the cam 430 has a protrusion 430a along the outer edge thereof. The switch 420 is fastened to the printed circuit board 20 by means of a screw and has a roller member 420d. The switch 420 is positioned adjacent the cam 430 so that the protrusion 430a actuates the roller member 420d when it is adjacent the switch. The roller member 420d is connected to the pole 420a (see FIG. 2) causing the pole 420a to be actuated in contact with 420c as the protrusion 430a of the cam 430 is moved in contact therewith.

Refer now to FIG. 4 which shows a plan view of the printed circuit board 20. The contacts and conductors of the commutators 210 and 410 are actually printed circuit conductors on the printed circuit board 20. The actual physical configuration of the contacts and conductors are as shown in FIG. 4. Connections to the conductors 211, 223, 224, and 411 are made via tabs 211a, 223a, 224a, and 411a on the printed circuit board 20.

As already indicated the programming means 100 includes a switching matrix which includes a plurality of conductive segments on the printed circuit board 20. The printed circuit board segments for the programming means 100 include the segments 111 through 132. The conductive segments of the programming means 100 are elongated, rectangular, conductive segments. The segments 111 through 120 are positioned parallel with respect to each other, and are arranged with one end thereof in a straight line adjacent to the conductors 121 through 132. The conductive segments 121 through 132 are also positioned parallel with respect to each other, but are positioned perpendicular with respect to the conductive segments 111 through 120 and are positioned adjacent to the ends of the conductive segments 111 through 120 which are positioned in a straight line. The conductive segments 111 through 120 are connected to the contacts 212 through 221 of the commutator 210, via printed circuit segments on the printed circuit board 20. Similarly, the conductive segments 121 through 132 are connected to the contacts or conductive segments 0, 2½, 5, 10, 15, 20, 25, 30, 35, 40, 50, and 60 of the commutator 410 via other conductive segments on the printed circuit board 20.

It will be noted that printed circuit tabs 111a through 120a are connected to the segments 111 through 120. The tabs 111a through 120a are used to make the actual connections to the solenoid coils 512 through 521 shown in FIG. 2. The connections are made to the coils by wires by inserting the wires through holes in the tabs 111a through 120a and soldering the wires to the tabs.

Circular openings 127, 128, and 129 are provided in the printed circuit board 20 to allow the flanges of 202c, 310 and 311 to extend therethrough.

Refer now to the brush assembly 222 shown in FIGS. 3A and 3B. The brush assembly 222 includes three brushes 222a. Each of the three brushes 222a are formed of three wiper blades, all of which are electrically connected in common at one end of the legs. The brush assembly 222a is mounted on the cam 232 by means of screws, and the cam 232 and brush assembly 222 are positioned such that the brushes 222a provide electrical connections to the contacts of the commutator 210 and the two conductive rings 223 and 224 as indicated in FIG. 3 and as described in detail with reference to FIG. 2.

The brush assembly 412 for the compare means 400 includes two sets of brushes 412a, each of which has three wiper blades. Brush assembly 412a is mounted on the cam 430 and the cam 430 and brush assembly 412 are positioned with respect to the printed circuit board 20 so that the brushes 412a provide electrical contact with the contacts of the commutator 410 and the circular conductor 411 as indicated in FIG. 3. The brushes 412 and 222 may be composed of a conductive material of one of a number of types well known in the switching art for this particular purpose.

The programming means 100 is programmed by making electrical connections between the conductive segments 111 through 120 and the appropriate one of the conductive segments 121 through 132. The actual electrical connection is made by means of the slideable switches 141 through 150. Refer now to FIG. 5 which shows a side elevation view of the switches 141 through 150 taken along the line 5—5 of FIG. 1 and to FIG. 6 which shows a view of the switches 140 and 150 taken along the line 6—6 of FIG. 5, with a portion of switch 149 and the mounting member 165 broken away. Each of the slideable switches 141 through 150 are identical, accordingly, the following description will make reference to switch 150 which is representative of each of the other switches in the programming unit 100.

The switch 150 includes a mounting member 160. Attached to the mounting member 160 is an elongated brush assembly 162. The brush assembly 162 includes two brushes, 162b and 162a, which are spaced apart and electrically connected together so as to provide electrical contact between the conductive segment 120 and each one, but only one, of the conductive segments 121 through 132. The brushes 162a and 162b each have three wiper blades extending out from the member 160. The brush assembly 162 is composed of a good electrical conductive material, such as bronze, which also has a resilient characteristic.

The panel 14 has a rear surface 14b against which the front side of the mounting member 160 slides. The brush assembly 162, due to its resilient characteristics, forces the mounting member 160 into contact with the rear surface 14b and provides a firm electrical contact with the conductive segment 120 and one of the conductive segments 121 through 132.

The mounting member 160 is elongated and has a handle 160a which protrudes out of the opening 14a in the controller panel 14. The switch 150 as well as the switches 141 through 149 are held in place, in a vertical direction as shown in FIG. 1 by the adjacent switches. However, the switches 150 and 141 are secured in a vertical direction, as viewed in FIG. 1, by means of shoulders which are not shown in the drawings. The switch 150 slides in a horizontal direction as viewed in FIGS. 1 and 5, with the handle 160a moving in between the edges of the opening 14a. The handle 160a is positioned on the member 160 in relation to the conductive segments 121 through 132, and to the indicia 16 on the panel 14 so that an operator can observe the time being selected by observing the number with which the handle 160a is aligned.

In addition to the visual indication, an indexing system is provided for the switch 150 to provide an indication to the feel of a user of when the switch 150 is correctly positioned with the contact 162a in electrical contact with one of the conductive segments 121 through 132 and also to provide a positive drive so as to automatically position the contact 162a in good electrical contact with one of the segments 121 through 132. To this end, a series of pairs of tapered indentations 168 are provided in a protrusion along one end of the member 160. A metallic spring member 169 has a pair of parallel arms 170 which force forces a pair of connected rollers 163 together and into the indentations 168. One of the rollers 163 is positioned on either side of the member 160. The arms 164 are adapted for forcing the rollers 163 into the indentations 168 as the user pushes the member 160 in between the edges of the opening 14a on the panel 14. Each time the contact 162a is in electrical contact with the center of one of the conductive segments 121 through 132, the rollers 163 are at the bottom of one of the pairs of indentations 168, thereby providing an indication to the feel of the user that the switch is properly positioned with respect to one of the conductive segments 121 through 132. The operator can observe which of the segments is being contacted by observing the numerals 16 on the panel 14. Additionally, the spring loaded rollers 163 prevent the switch 150 from being positioned in between two of the contacts 121 through 132 by driving the contact 162a into a central position with respect to one of the contacts 121 through 132. The positive drive is caused in part by the taper of the indentations 168 which cause the rollers to roll towards the center of the indentation and thereby drive the member and contacts in position.

A mounting member 165 runs along the length of the printed circuit board 20. The mounting member 165 has openings which match with openings provided in the printed circuit board 20. The spring member 169 has loops therein which extend down through the openings in the member 165 and the printed circuit board 20. An anchor member 166 is positioned through the loops in the spring member 169 along the rear side of the printed circuit board 20 to securely hold the spring member 169 in place. The anchor member 166 is positioned through the loops in each of the spring members 169 for each of the switches 141 through 150 as indicated by dashed lines in FIG. 6.

The panel 14 has protrusions 14c and 14d extending out from the panel 14 at the left and right hand sides of the opening in the panel as viewed in FIGS. 1 and 5. These protrusions are carefully positioned and spaced at the ends of the switches 141 through 150 so that a user can grip one of the protrusions with his fingers and grip the handle of one of the switches with his thumb on the same hand and force the switch into the desired position. This allows a user to easily overcome the restraint due to the positioning system in order to position the switches.

Additionally, the member 160 has a pair of shoulders 160a and 160b located at opposite sides of the contacts 162a and 162b. The shoulders 160a and 160b are mounted on and extend outwardly from the member 160 towards the printed circuit board 20. The member 160 is formed of a non conductive material and the shoulders 160a and 160b are formed as an integral part of the member 160 and serve the function of preventing the screws which connect the contact assembly 162 to the member 160 from being forced into contact with the conductive segments on the printed circuit board 20 by a user. The shoulders also prevent a user from forcing the member 160 so that the contacts 162 short the conductive segments 121 through 132 together.

It should be noted that the segments 121 through 132 may be spaced apart from the segments 111 through 120. For example, it may be desired to run the interconnecting segments from 111 through 120 to the contacts 212 through 221 in between the two groups of segments of the programming means 100. Yet, due to the elongated construction of the switches, electrical interconnections can still be made by appropriately dimensioning the switches.

The mounting member 160 is formed of a non conductive plastic material. The printed circuit board 20 is preferably formed of an epoxy material having a copper-silver-rhodium coating forming the conducting segments thereon. The cams 311 and 232 are formed of an insulating plastic material such as phenolic plastic.

What is claimed is:

1. A switching matrix the combination comprising a printed circuit board having a plurality of conductive segments thereon, comprising first and second pluralities of said conductive segments, said first segments being elongated and positioned parallel with respect to each other with the ends thereof in a substantially straight line, said second segments being elongated and positioned parallel with respect to each other and positioned adjacent to the ends of and perpendicular to said first segments; and means including elongated switch means for each of said first segments, said switch means comprising first and second slideable brush means electrically connected together and spaced apart and adapted for providing an electrical connection between the corresponding first conductive segment and only one of said second segments depending on the position of said slideable switch means, each of said slideable switch means being slideably mounted for movement parallel with said first segments with one of said brush means in continuous electrical contact therewith.

2. A switching matrix the combination comprising a printed circuit board having a plurality of conductive segments thereon, comprising first and second groups of said conductive segments, said first and second groups of segments being elongated and positioned parallel with respect to the other segments in the same group, said second segments being spaced apart from and positioned at the side of said first segments and oriented perpendicular to said first segments; and elongated switch means for each of said first segments, said switch means comprising first and second slideable brush means electrically connected together and spaced apart for providing an electrical connection between the corresponding first conductive segment and only one of said second segments, each of said slideable switch means being slideably mounted for movement parallel with said first segments with one of said brushes in continuous electrical contact therewith.

3. A switching matrix the combination comprising a substantially flat printed circuit board having a plurality of conductive segments thereon, comprising first and second groups of said conductive segments, said first and second segments being elongated and positioned parallel with respect to the other segments in the same group with the ends of said second segments aligned in a substantially straight line, said second segments being positioned adjacent to the ends of and perpendicular to said first segments; and elongated switch means for each of said first segments, said switch means comprising first and second slideable brush means electrically connected together, said first and second brush means comprising a resilient conductive material and spaced apart and adapted for providing a firm electrical connection with the corresponding first conductive segment and only one of said second segments depending on the position of said slideable switch means, each of said slideable switch means being slideably mounted for movement parallel with said first segments with one of said brushes in continuous electrical contact therewith.

4. A switching matrix the combination comprising a substantially flat printed circuit board having a plurality of conductive segments thereon, comprising first and second groups of said conductive segments, said first and second groups of segments being elongated and positioned parallel with respect to the other segments in the same group, said second segments being spaced apart from and positioned at the side of said first segments and oriented perpendicular to said first segments; and means including a guide structure positioned in close proximity to said printed circuit board and elongated switch means for each of said first segments, said switch means being positioned in between the guide structure and the printed circuit board and comprising a mounting member and first and second resilient brush means electrically connected together and extending outwardly from said member, said first and second resilient brush means being spaced apart and adapted for providing a firm electrical connection between the corresponding first conductive segment and only one of said second segments, and adapted for forcing said member into engagement with said guide structure, said slideable switch means being slideably mounted for movement parallel with said first segments with one of said brushes in continuous electrical contact therewith and the other brush making contact with one of said second segments.

5. A switching matrix as defined in claim 4 wherein said member comprises an elongated locating member having a plurality of pairs of indentations spaced at preselected positions along the length thereof, said pairs being positioned adjacent each other on opposite sides of said locating member, said switch means comprising a roller for each side of said locating member and a spring bias means adapted for forcing said rollers together in engagement with one pair of said indentations at a time, said rollers and indentations being positioned relative to said printed circuit board such that the rollers engage a different pair of indentations each time electrical contact is made with one of said second segments.

6. In switch panel comprising a panel member having an opening therein and a substantially flat rear surface; and a switching device for mounting in said panel member comprising a substantially flat printed circuit board having a plurality of conductive segments thereon, said printed circuit board being positioned with the segments facing said panel opening and substantially parallel with and in close proximity to said rear surface, said conductive segments comprising first and second pluralities of said conductive segments, said first segments being elongated and positioned parallel with respect to each other and positioned substantially perpendicular to and adjacent to said second segments, and switch means for each of said first segments, said switch means comprising an elongated mounting member and first and second resilient brushes mounted on and extending outwardly from said mounting member and electrically connected together and spaced apart and adapted so that one brush provides an electrical contact with the corresponding first conductive segment and the other brush provides electrical contact with one of said second segments depending on the position of the mounting member, said switch means being positioned in between said rear surface and said printed circuit board and said resilient brushes being adapted for causing a force between the conductive segments and the brush means tending to force the mounting member into engagement with said rear surface, said slideable switch means being slideably mounted for movement parallel with said first segments with one brush in continuous electrical and sliding contact with the said first segments.

7. In a swtch panel as defined in claim 6 wherein said elongated member has an indentation for each of said second segments, said indentations being spaced apart the same distance as the corresponding second segments, said switch means comprising means adapted for engaging said indentations and for providing an indication to a user of the relative position of a brush to each of said second segments.

8. In a control apparatus the combination comprising a printed circuit board having a plurality of conductive segments thereon; programming means comprising first and second groups of said conductive segments positioned parallel with respect to the segments in the same group, said second conductive segments being positioned substantially perpendicular to and adjacent to said first segments, and switch means comprising a mounting member and first and second electrical brushes extending outwardly from said mounting member and electrically connected together and positioned with respect to each other so that one brush provides a continuous electrical contact with the corresponding first conductive segment and the other brush provides electrical contact with one of said second segments depending on the position of said mounting member, each of said slideable switch means being slideably mounted for movement parallel with said first segments; first and second rotary switch means, each of said rotary switch means individually comprising a third group of said conductive segments which are positioned in a circular pattern, rotatably mounted brush means for providing electrical contact, individually, with said third conductive segments, and motor means mechanically and rotatably coupled to said brush means for causing electrical contact to be made, sequentially, between said brush means and said third conductive segments; a fourth group of said conductive segments electrically connecting the first segments to the segments in one of said rotary switch means; and a fifth group of said conductive segments electrically connecting the second segments to the segments in the other of said rotary switch means.

9. In a control apparatus the combination comprising a printed circuit board having a plurality of conductive segments thereon; programming means comprising first and second groups of said conductive segments positioned parallel with respect to the segments in the same group, said second conductive segments being positioned substantially perpendicular to and adjacent to said first segments, and switch means for each of said second segments, said switch means comprising a mounting member and first and second electrical brushes extending outwardly from said mounting member and electrically connected together and positioned with respect to each other so that one brush provides a continuous electrical contact with the corresponding first conductive segment and the other brush provides electrical contact with one of said second segments depending on the position of said mounting member, each of said slideable switch means being slideably mounted for movement parallel with said first segments; rotary switch means, said rotary switch means comprising a third group of said conductive segments which are positioned in a circular pattern, rotatably mounted brush means for providing electrical contact, individually, with said third conductive segments, and motor means mechanically and rotatably coupled to said brush means for causing electrical contact to be made, sequentially, between said brush means and said third conductive segments; and a fourth group of said conductive segments electrically connecting the segments in said programming means to the segments in said rotary switch means.

10. Control apparatus the combination comprising: a printed circuit board including a plurality of printed conductive segments thereon; means including a first plurality of said printed conductive segments arranged in a circular switch pattern, first electrical brush means rotatably mounted and adapted for providing electrical connections to said first switch segments, timing motor means mechanically coupled and adapted for rotating said first brush means from one of said first conductive segments to the next to thereby provide an indication of elapsed time; selection means including a second plurality of said conductive segments arranged in a circular switch pattern, second electrical brush means rotatably mounted and adapted for providing electrical connections to said second segments, means for applying signals to said second brush means, and second controllable motor means including a control circuit coupled to said first electrical brush means, the second motor means being mechanically coupled to said second brush means for rotating same from one of said second electrical conductive segments to the next in response to a signal applied to said control circuit and thereby cause timed signals from said signal means to be sequentially applied to said second segments; programming means comprising third and fourth groups of said conductive segments, said third and fourth groups of conductive segments being elongated and positioned parallel to the other segments in the same group, said third group of conductive segments being positioned perpendicular to said fourth group of segments, said third and fourth conductive segments being connected through others of said segments to the conductive segments of said first and second conductive segments, said programming means additionally comprising slideable switch means for each of said fourth segments comprising a mounting member and first and second electrical brush means for providing an electrical contact between a desired one of said third segments, depending on the position of said mounting member, and the corresponding fourth conductive segment in accordance with a prearranged program of timed intervals for the application of signals to said second conductive segments; reset control means including reset motor means rotatably coupled to said first brush means for resetting same to an initial condition, said second motor means being operative to rotate said second brush means out of contact with one of said second segments in response to a signal coupled through the programming means and timing means from one of said second conductive segments, said means for applying signals to said second brush means including means for momentarily removing such signal causing said second brush means to remain out of contact with said second conductive segments while said reset motor means resets said first brush means.

11. Control apparatus the combination comprising: a printed circuit board including a plurality of printed conductive segments thereon; means including a first plurality of said printed conductive segments arranged in a circular switch pattern, first electrical brush means rotatably mounted and adapted for providing electrical connections to said first switch segments and timing motor means mechanically coupled and adapted for rotating said first brush means from one of said first conductive segments to the next to thereby provide an indication of elapsed time; selection means including a second plurality of said conductive segments arranged in a circular switch pattern, second electrical brush means rotatably mounted and adapted for providing electrical connections to said second segments, means for applying signals to said second brush means, and second controllable motor means including a control circuit coupled to said first electrical means, the second motor means being mechanically coupled to said second brush means for rotating same from one of said second electrical conductive segments to the next in response to a signal applied to said control circuit and thereby cause timed signals from said signal means to be sequentially applied to said second segments; programming means comprising third and fourth groups of said conductive segments, said third and fourth groups of conductive segments being elongated and positioned parallel to the other segments in the same group, said third group of conductive segments being positioned perpendicular to said fourth group of segments, said third and fourth conductive segments being connected through others of said segments to the conductive segments of said first and second conductive segments, said programming means additionally comprising slideable switch means for each of said fourth segments comprising a mounting member and first and second electrical brush means for providing an electrical contact between a desired one of said third segments depending on the position of said mounting member, and the corresponding fourth conductive segment in accordance with a prearranged program of timed intervals for the application of signals to said second conductive segments, said first electrical brush means causing said second motor means to rotate said second brush means out of contact with one of said second segments in response to the coupling of a signal through the programming means and timing means from one of said second conductive segments, said signal applying means including a cam operated switch means mechanically coupled to said second motor means for interrupting such signal when said second brush means is out of contact with said second brush means and thereby interrupt said timed signals.

References Cited

UNITED STATES PATENTS

| | | | |
|---|---|---|---|
| 3,027,506 | 3/1962 | Stenhammar et al. | 307—141.8 X |
| 3,146,320 | 8/1964 | Wang et al. | 200—16 X |
| 3,152,323 | 10/1964 | Pardee | 307—141.8 X |
| 3,205,319 | 9/1965 | Anderson et al. | 200—16 |
| 3,215,999 | 11/1965 | Dawson | 307—141.8 X |

ORIS L. RADER, *Primary Examiner.*

T. B. JOIKE, *Assistant Examiner.*